April 24, 1962 A. R. CRAWFORD 3,030,733
TOY
Filed Jan. 4, 1960
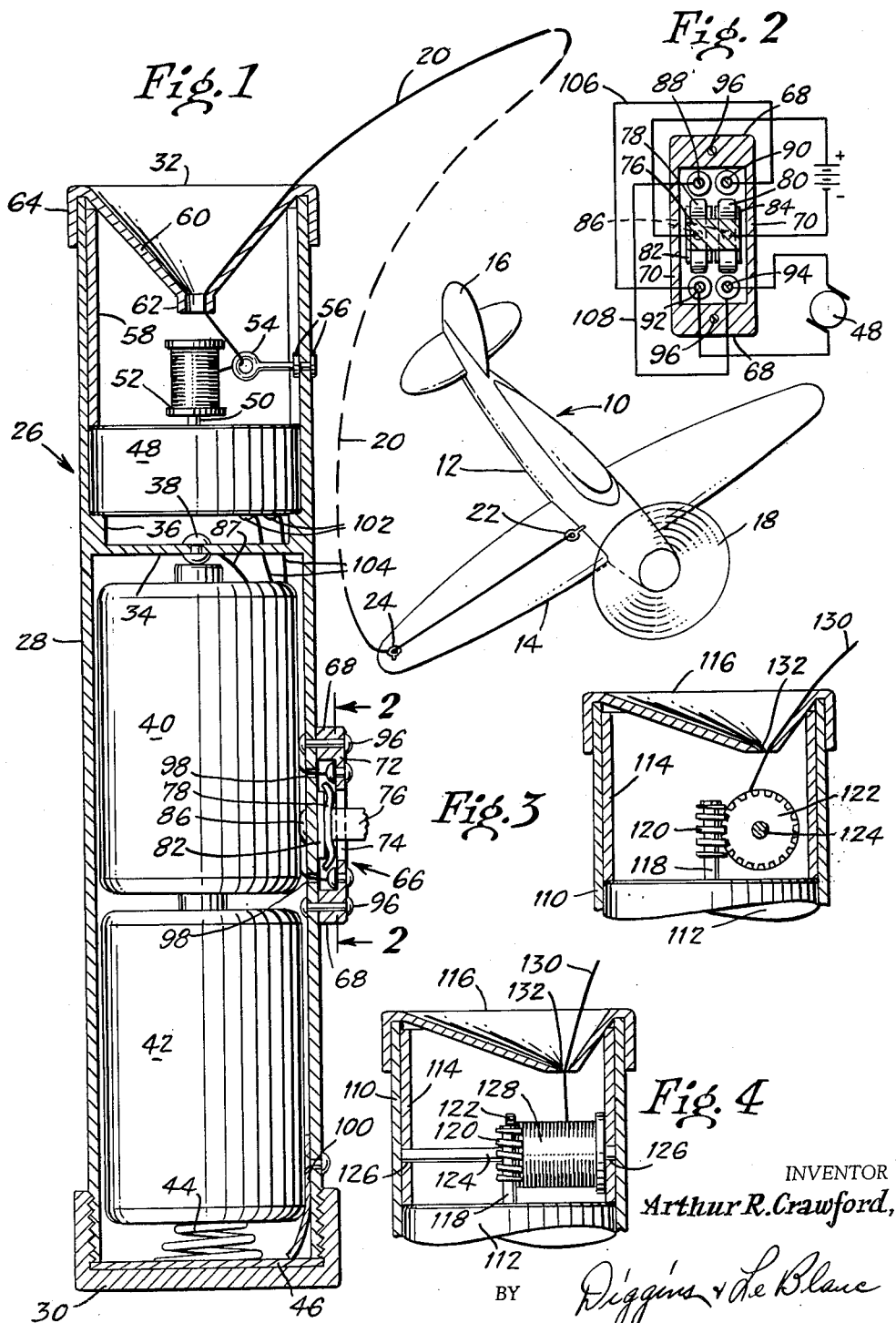
INVENTOR
Arthur R. Crawford,
BY Diggins & LeBlanc
ATTORNEYS

3,030,733
TOY
Arthur R. Crawford, Columbus, Ohio
(P.O. Box 63, Worthington, Ohio)
Filed Jan. 4, 1960, Ser. No. 182
2 Claims. (Cl. 46—243)

This invention relates to a toy or amusement device and more particularly relates to a tethered glider which is controlled by a powered control line.

Toy aircraft or airplanes of the power driven type are capable of sustained flight and are commonly tethered by means of a strong cable, the end of which is held and controlled by the operator to cause the aircraft to fly in closed circles. By means of a suitable control harness the operator is able to cause the plane to execute a variety of maneuvers. The operation of such aircraft has grown in popularity to the point where ready built aircraft of various sizes and types are available on the market with more or less elaborate control systems. The aircraft and control units are generally somewhat expensive and the sport is normally limited to adults or relatively older children in that the arcraft engine can be dangerous. In addition, the engines are quite noisy.

According to the present invention, it has now been found that much of the maneuverability of a powered toy aircraft may be achieved in a tethered toy glider, whereaircraft may be achieved in a tethered toy glider, wherein the tethering unit provides a type of control which was not heretofore feasible. Thus, according to the invention, a relatively heavy metal glider is tethered by means of a light cable attached to its fuselage and passing through an eye at its wing tip. The other end of this cable is received in a control unit which is capable of rapidly taking in or feeding out the tethering cable. If the glider is swung in a circle by an operator, it will remain in flight. The control unit can then be used to feed out line until the glider is swinging in a large circle. At this point, the operator can control its flight by operation of the control unit, changing its speed of flight and causing it to execute various maneuvers the intricacy of which depend upon the skill of the operator. If the control unit is caused to rapidly draw in the tethering cable, the radius of flight of the glider is shortened and it accordingly rapidly picks up speed. Contrariwise, if the control unit is caused to feed out tethering cable, the speed of the glider can be diminished even to the point of stall if so desired. By alternating between "feed-in" and "feed-out," the operator can cause the glider to execute many of the maneuvers possible with a powered aircraft.

While the toy aircraft of this invention is capable of achieving substantially the same effect as toy powered aircraft, it is much less expensive, is absolutely harmless and can be operated in a much smaller space.

It is accordingly a primary object of the present invention to provide an improved toy aircraft of the glider type.

It is another object of the present invention to provide an improved toy aircraft of the tethered glider type having a control unit capable of rapidly feeding out and retracting the tethering cable.

It is still another object of the present invention to provide an improved toy aircraft of the tethered glider type having a control device capable of rapidly feeding out or retracting the tethering cable wherein the control unit is light in weight and small in size so as to be readily handled with one hand.

These and further objects and advantages of the invention will become more apparent upon reference to the following specification and claims and the appended drawings wherein:

FIGURE 1 shows a tethered glider with a control unit constructed according to the invention shown in vertical cross-section;

FIGURE 2 is a section of the switch on the control unit of FIGURE 1 taken on the line 2—2 of FIGURE 1;

FIGURE 3 is a partial vertical cross-section of another embodiment of the control unit; and FIGURE 4 is a further vertical section of the embodiment of FIGURE 3 taken at 90 degrees from the view of FIGURE 3, but showing the gear, gear shaft and reel without sectioning.

Referring to FIGURE 1 there is seen a toy aircraft or glider indicated generally at 10 which consists of a fuselage 12, wings 14 and tail assembly 16. The glider must be of some weight in order to operate effectively according to the invention and in a specific embodiment may be constructed of aluminum and have a weight of approximately 9 ounces. The glider may, as an example, have a wing span of one foot and have a fuselage approximately 11 inches long. A propeller 18 may be provided to give a realistic effect in flight.

Attached to the fuselage 12 of the glider 10 on the centerline of the wing is one end of a tethering cable 20. This attachment may be made by means of an eyelet 22 or any other suitable means and, according to the invention, the cable 20 passes through a further eyelet 24 at the edge of the wing 14. The other end of the tethering cable 20 is attached to the control unit indicated generally at 26.

The control unit 26 is similar in shape to a two dry cell hand flash-light and consists of a cylindrical casing 28, a bottom closure 30 and a funnel shaped top closure 32. In the specific embodiment illustrated, the casing 28 is formed of plastic and has a separating diaphragm 34 and flange 36 integrally formed therein. The diaphragm 34 has mounted in the center thereof a metal rivet 38 which engages the top pole of a conventional flash-light type dry cell 40. A second dry cell 42 is mounted therebeneath and is urged into engagement with the upper dry cell by means of a spring 44 which is received within the cap 30 on top of a metal plate 46 which may be cemented in the cap. The cap itself is screw-threadedly attached to the casing 28.

Received on top of the flange 36 is a small D.C. motor 48 having a self-contained reduction gear. The motor may be of the type capable of operating from a dry cell at a speed of 3000–4000 r.p.m. which is geared down by the reduction gear to approximately 100 r.p.m. The shaft 50 which emerges from the motor reduction gear unit has mounted thereon a spool 52 on which the tethering cable 20 is wound. An eye 54 is attached to the casing 28 of the control unit by means of flanges 56 and the tethering cable 20 passes therethrough. The motor-reduction gear unit 48 is held in position by means of a split sleeve 58 received within the casing 28 above the motor with the split in the sleeve adjacent the flanges 56 of the eyelet 54. The control unit is closed by means of the funnel-shaped top 32 having a funnel-shaped central portion 60 terminating in a cylindrical bottom portion 62. The upper portion of the closure 32 forms a downwardly extending flange 64 which may be cemented to the casing 28.

Attached to the side of the casing 28 is a double pole, double throw slide type switch generally indicated at 66. This switch is contained within a housing having end walls 68, side walls 70 and a top wall 72. The top wall is slotted at 74 and a rectangular handle 76 extends therethrough. Attached to the under-side of the handle 76 are a pair of resilient strips 78 and 80 whose ends are slightly curled upwardly toward the top wall 72, as is seen in FIGURE 1.

The strips 78 and 80 ride across a pair of spaced plates 82 and 84 which are attached to the outer surface of the casing 28 by means of rivets 86. Four rivets 88—94 are mounted in the top wall 72 of the switch housing in positions to be engaged by the ends of the strips 78 and 80 as the handle 76 is moved upwardly and downwardly in FIGURE 1. The switch housing is attached to the casing 28 by means of rivets 96 passing through the end walls 68. Four apertures 98 are provided in the casing opposite the rivets 88—94 to pass connecting wires.

Riveted to the casing 28 adjacent the bottom thereof is a connector finger 100 which engages the plate 46 in cap 30. This finger is attached by means of a wire, not shown, to one of the rivets 86 which makes connection with one of the resilient strips 78 or 80. The other rivet 86 which makes connection with the other resilient strip is connected by wire 87 to the rivet 38 and the diaphragm 34 so that the two resilient strips of the switch are connected to the battery terminals as indicated in FIGURE 2.

The motor-reduction gear unit 48 is provided with terminals 102 and these are connected by means of wires 104 to the rivets 88 and 90 in FIGURE 2. Rivets 88 and 90 in turn are connected to rivets 92 and 94 by means of conductors 106 and 108 such that rivet 88 is connected to rivet 94 and rivet 90 is connected to rivet 92, thereby providing the conventional "criss-cross" connection for the double pole double throw switch. As will be apparent to those skilled in the art, when the handle 76 of the switch 66 is moved upwardly, the motor 48 will rotate in one direction, whereas when the switch is moved downwardly, it will rotate in the opposite direction. With the handle 76 in the mid-position shown in FIGURE 1 the motor is stationary.

In operation the switch is utilized to cause the motor to feed out enough line to allow the glider 10 to be swung by an operator to initially get the glider in flight. After this has been done the motor is caused to feed out line until the glider is circling in a circle of the desired radius. At this point it is possible to have the glider execute various maneuvers by causing the motor 48 to either feed in or feed out tethering cable thereby increasing or decreasing the speed of the glider.

It is one of the features of the instant invention that the motor unit act as an adequate brake by reason of the reduction gearing. That is to say, with the switch in the neutral position so that the motor is de-energized, the tethering cable does not feed out due to the braking action of the reduction gear. The tethering cable should of course be light in weight and is preferably formed of a nylon thread. With a glider approximately 9 ounces in weight it is possible to utilize as much as 100 feet of thread.

While the control unit of FIGURE 1 utilizes a reel rotating on an axis coincidental with the axis of the casing, it is also possible to utilize an arrangement wherein the reel is disposed at right angles to the casing axis and this permits the elimination of the eyelet 54.

Referring to FIGURES 3 and 4 there is shown an embodiment of the invention wherein a casing 110 carries a motor 112 which, in this case, does not have a self-contained reduction gear. The motor is held in position by means of a sleeve 114 which abuts against the funnel shaped cover 116. The shaft 118 of motor 112 has mounted thereon a worm gear 120 which engages a gear 122 mounted on a shaft 124 journalled in apertures 126 in the sleeve 114. Gear 122 is keyed or otherwise locked to shaft 124 so that rotation of the motor causes rotation of shaft 124. A reel 128 is mounted on shaft 124 for rotation therewith and has the tethering cable 130 wound thereon. In this embodiment of the invention, the funnel shaped cover 116 is not symmetrical but provides an opening 132 which is directly over the reel 128. The operation of this embodiment of the invention is similar to that previously described and it will be clear that the worm and gear arrangement again provides the desired braking.

It will be appreciated from the foregoing that according to the present invention there has been provided a unique glider and control arrangement which can be produced at a low cost. While the control unit has been described as being mounted in a plastic casing, it will be obvious to those skilled in the art that metallic casing, such as a flash light casing could be used where so desired. Similarly, while the glider itself has been described as being formed of aluminum, it is obvious that plastic of adequate weight could also be used.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A toy comprising a glider attached by a cable to a control means capable of being manipulated with one hand, said glider being of such a weight as to enable it to be sustained in flight by manually swinging it at the end of said cable, said control means including a reel about which said cable may be wound and unwound, a reversible motor, a reduction gear between said reel and said motor to form a brake for said reel to prevent feed-out of cable when said motor is de-energized, batteries, and a three condition switch connected to said batteries and said motor to permit said motor to be de-energized as well as to be energized to run in two directions to reel in and reel out said cable.

2. A toy as set out in claim 1 wherein said control means is mounted in a tubular case, and said switch is a slide type switch manipulatable by one finger of the hand holding the case.

References Cited in the file of this patent

UNITED STATES PATENTS

| | | |
|---|---|---|
| 2,406,874 | Walker | Sept. 3, 1946 |
| 2,429,502 | Young | Oct. 21, 1947 |
| 2,433,344 | Crosby | Dec. 30, 1947 |
| 2,805,349 | Friedman | Sept. 3, 1957 |
| 2,834,152 | Lambert | May 13, 1958 |
| 2,841,921 | Freeman | July 8, 1958 |
| 2,896,875 | Reed et al. | July 28, 1959 |